United States Patent [19]

Maisch et al.

[11] Patent Number: 4,859,141
[45] Date of Patent: Aug. 22, 1989

[54] METALLIC HOLLOW COMPONENT WITH A METALLIC INSERT, ESPECIALLY TURBINE BLADE WITH COOLING INSERT

[75] Inventors: Helmut Maisch, Groebenzell; Dieter Fedrau, Zorneding, both of Fed. Rep. of Germany

[73] Assignee: MTU-Motoren-und Turbinen-Union Muenchen GmbH, Munich, Fed. Rep. of Germany

[21] Appl. No.: 92,666

[22] Filed: Sep. 3, 1987

[30] Foreign Application Priority Data

Sep. 3, 1986 [DE] Fed. Rep. of Germany ....... 3629910

[51] Int. Cl.$^4$ ................................................ F01D 5/18
[52] U.S. Cl. ....................................... 415/115; 415/134
[58] Field of Search ............... 415/115, 116, 134, 136, 415/137, 138; 416/92, 96 A, 97 R; 60/527; 428/960; 148/402

[56] References Cited

U.S. PATENT DOCUMENTS

| | | | |
|---|---|---|---|
| 3,301,527 | 1/1967 | Kercher | 415/115 |
| 3,540,810 | 11/1967 | Kercher | 415/115 X |
| 3,623,318 | 11/1971 | Shank | 415/115 X |
| 3,764,227 | 10/1973 | Albertzart | 416/39 |
| 3,767,322 | 10/1973 | Durgin et al. | 415/115 X |
| 3,806,276 | 4/1974 | Aspinwall | 415/115 X |
| 4,198,081 | 4/1980 | Harrison et al. | 428/960 X |
| 4,257,734 | 3/1981 | Guy et al. | 415/115 |
| 4,288,201 | 9/1981 | Wilson | 415/115 |
| 4,379,575 | 4/1983 | Martin | 428/960 X |
| 4,396,349 | 8/1983 | Hueber | 415/115 |

FOREIGN PATENT DOCUMENTS 1476790 3/1970 Fed. Rep. of Germany .
2320581 6/1984 Fed. Rep. of Germany .

OTHER PUBLICATIONS

"Shape Memory Alloys", L. Schetky, *Scientific American*, vol. 241, No. 5, Nov. 1979, pp. 68–76.

*Primary Examiner*—Robert E. Garrett
*Assistant Examiner*—Joseph M. Pitko
*Attorney, Agent, or Firm*—Barnes & Thornburg

[57] ABSTRACT

A metallic hollow structural part, whose inner geometry is matched to at least one metallic insert supported thereat and pre-profiled to the finished condition, which is secured at the hollow structural part under predetermined heat influence, especially a turbine blade with a cooling insert. The insert is made of memory material and upon exceeding a predetermined temperature threshold value, abuts without play at the inner geometry. The hollow structural part and the insert can be fixedly connected with each other metallurgically or in the way of the "memory effect".

19 Claims, 3 Drawing Sheets

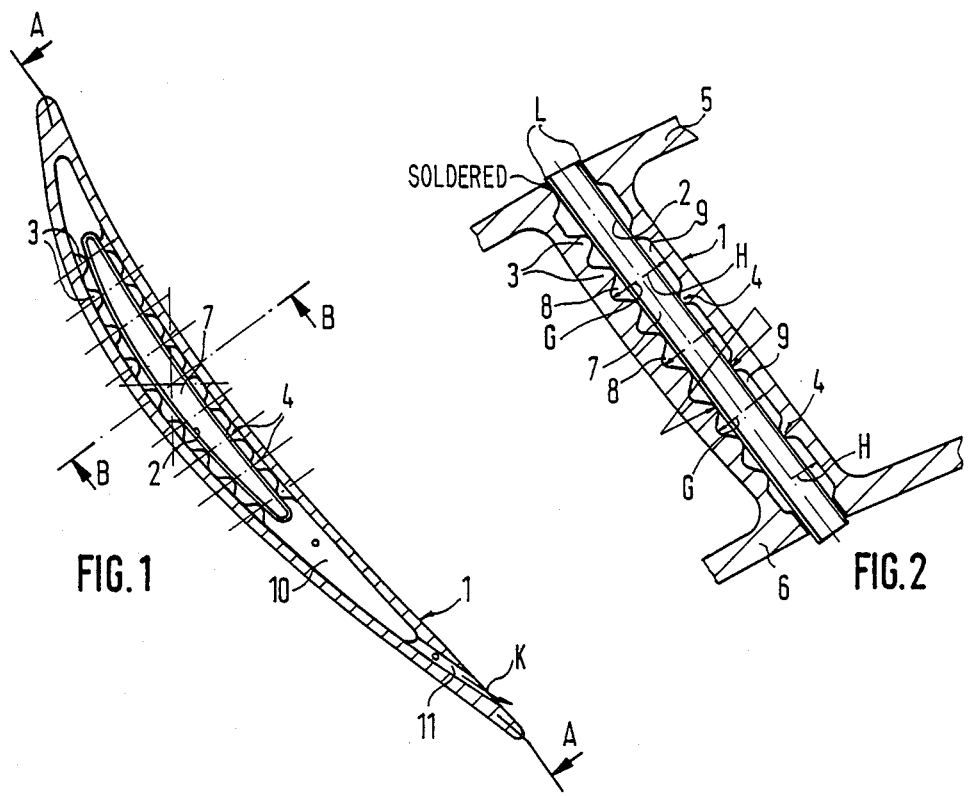

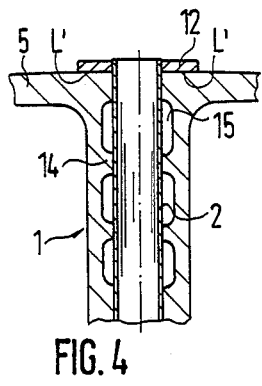
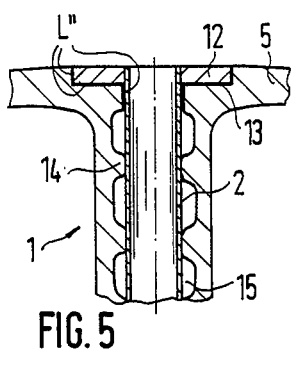
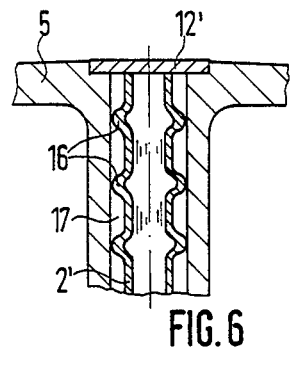
FIG. 4    FIG. 5    FIG. 6
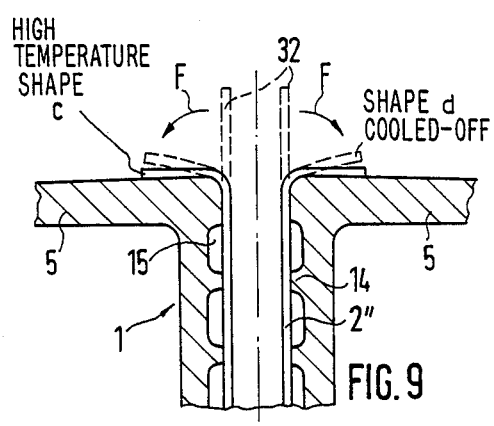
FIG. 9
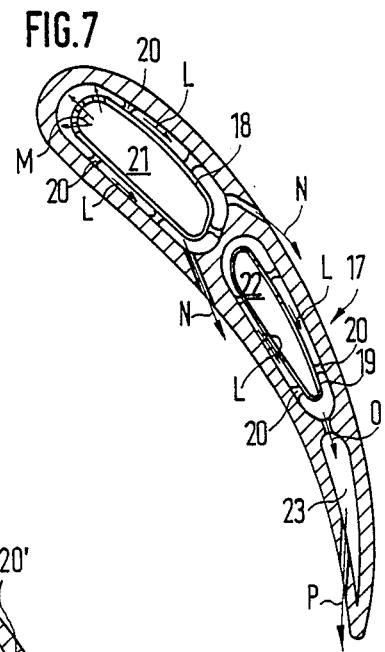
FIG. 7
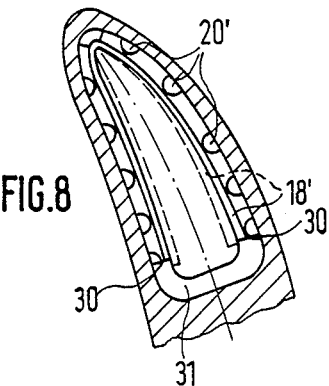
FIG. 8

METALLIC HOLLOW COMPONENT WITH A METALLIC INSERT, ESPECIALLY TURBINE BLADE WITH COOLING INSERT

BACKGROUND AND SUMMARY OF THE INVENTION

The present invention relates to a metallic hollow structural component with a metallic insert, especially to a turbine blade with a cooling insert.

For example, in the gas turbine propulsion unit construction, it is generally known to cool turbine guide or rotor blades exposed to comparatively high hot gas temperatures by means of cooling air taken off from the propulsion unit compressor at a suitable place and to provide for the respective blade cooling concept a cooling insert installed into the blade interior (see DE-14 76 790). The installation of several cooling inserts into correspondingly geometrically coordinated blade interior spaces is also known (see DE-OS 23 20 581).

In such or similar cases, at least a part of the corresponding blade cooling system is made available by webs, knubs, folds or the like projecting in a material sense from the blade hollow space interior wall and/or the cooling insert outer wall; inter alia a control of the cooling air flowing from the insert into the channel configuration which justifies the needs of the different hot gas temperature influences can be achieved therewith; inter alia; locally uniform or non-uniform cooling air dwell periods or velocities, as required, can therefore be made available.

In the aforementioned or similar known cases, it is a basic prerequisite for an optimum cooling function which is as low in consumption as possible, that the cooling insert or inserts abut during operation "flush", i.e., without play at the geometrically matched inner counter-surface or surfaces of the blade body. However, this basic prerequisite could not be fulfilled heretofore for assembly and manufacturing reasons; notwithstanding aimed-at, very accurate manufacturing techniques, considerable manufacturing tolerances result with the cooling insert as also, for example, with the cast blade core which can be met either not at all or only with relatively high expenditures in afterfinishing operations.

For purposes of assembly of the insert, corresponding installation difficulties additionally result also as consequence of frequently required profile-geometric distortions. In other words, the installation of the insert requires therefore a relatively great component play if the highly complicated afterfinishing expenditures are to be dispensed with, which, however, becomes effective disadvantageously on the operational cooling function because no "flush", respectively, play-free component abutment exists between blade core and insert.

An additional problem results in that the insert must be connected with the blade body in a suitable form, i.e., must be connected practically non-detachably fixedly; this takes place most recently, for example, by brazing processes in a vacuum integrated into the manufacturing process, in which individual blade groups provided with the inserts are subjected to the locally required brazing.

As a result of the component play requirements between the blade body, on the one hand, and the insert, on the other, as mentioned hereinabove within the scope of the prior art blade concepts and manufacturing technologies, it has been practically impossible heretofore to braze the insert with the blade body in a sufficiently accurate position satisfying the operating requirements or possibly weld the same together.

Added to the aforementioned problems is the fact that notwithstanding a practically non-detachable fastening of the insert at the blade body, expansion differences occurring as a condition of operation must be controllable in order to be able to keep within limits undesired component deformations, especially of the insert, as well as structural impairments of the respective cooling system. Thermally conditioned expansion differences have thereby their origin, inter alia, in the differing temperature exposures of the blade body and of the insert.

The present invention is therefore concerned with the task to achieve with a hollow structural component having at least one insert of the type described above, especially with a turbine blade having a cooling insert, an operationally optimal play-free component pairing and fastening favorable from an assembly and manufacturing point of view notwithstanding mutual manufacturing tolerances.

The underlying problems are solved according to the present invention in that the insert is made of a memory material and abuts without play at the inner geometry when exceeding a predetermined temperature threshold value.

On the basis of the specific properties of memory materials which will be described more fully hereinafter, the respective insert can be manufactured so small that it can be inserted without any problems into the corresponding geometrically coordinated inner recess or aperture of the hollow component, respectively, of the blade core, even with unfavorable tolerance pairings. During the metallurgical fastening process, for example, during brazing in a vacuum, the insert expands relatively rapidly when exceeding a predetermined temperature threshold value—i.e., at a threshold temperature lying far below the maximum brazing temperature of about 1350° C.—to such an extent that it abuts without play at the predetermined actual core shape, respectively, inner geometry of the hollow component.

High manufacturing tolerances can thus be permitted in favor of a cost-reduced manufacture, for example, for a turbine blade, respectively, the blade hollow profile body as also for the cooling insert. Notwithstanding such permissive high manufacturing tolerances, the aimed-at freedom of play, an optimum control of the cooling air and a high cooling effect are achieved, for example, with a turbine blade.

The term "memory alloys", respectively, of the "memory effect" stems from the prior discovery that a certain alloy can change between two structural phases in the solid condition when exceeding or falling below a characteristic temperature value. This "memory effect" occurs particularly pronouncedly within the scope of a nickel-titanium alloy, the use of which forms part of the present invention.

The concept of the "memory effect" therefore rests on the experimentally gained impression that the respective alloy component "remembers" its prior shape, which resulted in the coining of terms such as "shape memory effect".

Within the scope of the present invention, on the one hand, one may therefore start with the fact that the respective "memory-insert" maintains a shape mechanically imposed thereon at low temperature up to a so-called "threshold value". Only when the exposure temperature exceeds this "threshold value", the memory insert then remembers its original shape condition, i.e., returns into its original shape. In the course of this re-deformation, the "memory insert" is capable to abut itself without play at the actual core shape of the hollow component, respectively, at the inner contour of the blade hollow profile. This aforementioned "memory effect" is also referred to as so-called "one-way effect". The return-expansion of the "memory insert" which takes place when falling below the temperature threshold value, would have no disadvantage as regards the cooling effectiveness because the temperature threshold value would have to be placed in such a low temperature range (for example, 100°-150° C.), in which a blade cooling would not be necessary anyhow.

The present invention can also be realized without difficulty within the scope of a so-called "two-way memory-effect"; in this case the component is subjected in the martensitic condition a to a relatively strong bending deformation b (with irreversible component) as well as subsequently heated so that a desired high temperature shape c will establish itself in the austenitic phase. If the component is thereafter cooled, then a low temperature shape d will form. When carrying out the temperature cycles, the component therefore "remembers" the high temperature shape c as also the low temperature shape d. The high temperature shape c would therefore be the optimum shape in the instant case in which the insert abuts absolutely play-free at the corresponding inner component geometry. An important advantage of this "two-way effect" is that during component cooling (shape d), only a comparatively slight shape deviation (respectively, expansion change) results between shape c and d, in which freedom of play of the insert (wedging seat) continues to be still possible in a most far-reaching manner, i.e., "freedom of play" and therewith an optimum turbine blade cooling is assured over a comparatively large turbine operating—and hot gas temperature range.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a cross-sectional view through a turbine guide blade profile including cooling insert and cooling channel configuration in accordance with the present invention;

FIG. 2 is a longitudinal cross-sectional view through the blade of FIG. 1, taken along line B—B of FIG. 1;

FIG. 4 is a partial cross-sectional view through a modified embodiment of the cooling- and insert-fastening concept in a turbine guide blade according to the present invention, similar to the cross section B—B of FIG. 1;

FIG. 5 is a partial cross-sectional view, similar to FIG. 4, through a turbine guide blade with a modified insert construction and fastening concept in accordance with the present invention;

FIG. 6 is a partial cross-sectional view, similar to FIG. 5, through a turbine guide blade with a further modified insert construction and fastening as well as cooling concept in accordance with the present invention;

FIG. 7 is a cross-sectional view similar to FIG. 1, through a turbine hollow profile body having a modified cooling concept in combination with two cooling inserts in accordance with the present invention;

FIG. 8 is a partial cross-sectional view through the forward blade section of a still further modified embodiment in accordance with the present invention with a cooling insert divided at a suitable place and subjected to an unfolding shape change when exceeding a temperature threshold value; and FIG. 9 is a partial cross-sectional view, similar to FIG. 4, through another modified embodiment of a turbine guide blade, in which the shape change of the insert is linked at the same time with an insert fastening at the blade body.

DETAILED DESCRIPTION OF THE DRAWINGS

Figure 3:
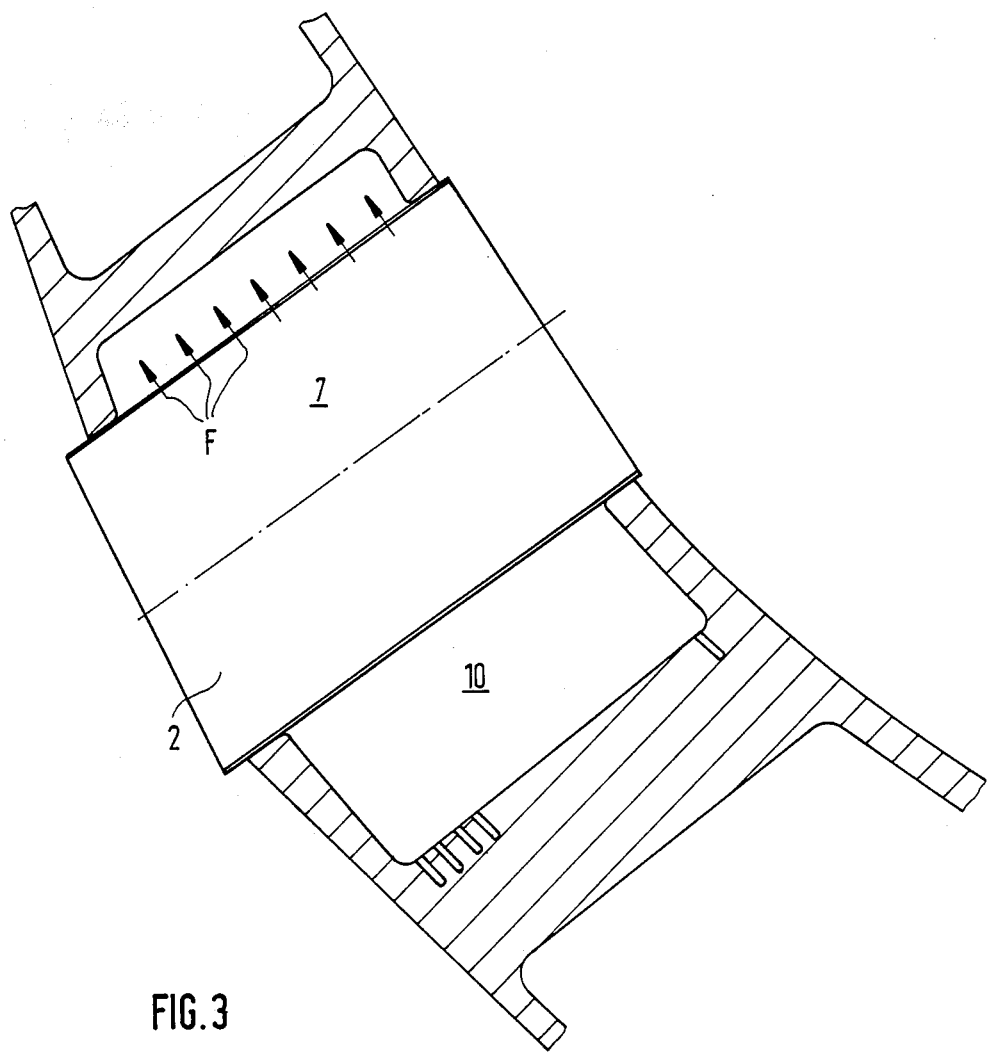
FIG. 3 is a cross-sectional view taken along line A—A of FIG. 1.

Referring now to the drawing wherein like reference numerals are used throughout the various views to designate like parts, according to FIGS. 1 to 3, the respective metallic hollow component is indicated by a hollow blade profile body generally designated by reference numeral 1 of a turbine guide blade which includes a cooling insert 2.

In the instant case, the cooling insert is made of smooth walls. The required cooling geometry is represented by knubs 3 and 4 of the blade hollow profile body 1 which project toward the insert 2; the knubs 3 and 4 are integral components of the hollow profile body 1. Operational prerequisite is the fact that the cooling insert 2 is supported free of play essentially over its entire structural length at the hollow body 1, i.e., especially at the laterally protruding knub ends. In the instant case, the blade hollow profile body 1 is enlarged by means of laterally protruding cover band segment plates 5 and 6 which protrude laterally at the base and head end, i.e., the insert is guided at both ends by corresponding apertures of the segment plates 5 and 6.

According to the present invention, the cooling insert 2 is now to be made of a memory material so that it can abut at a predetermined blade interior geometry when exceeding a predetermined temperature threshold value. Exceeding the temperature threshold value may result, for example, from the temperature exposure of the structural components which occur, for example, when metallurgically fixedly connecting the cooling insert 2 at the hollow profile body 1.

The metallurgically fixed connection can be undertaken, for example, by brazing, welding, diffusion welding or diffusion connection processes particularly suitable therefor. Common to all of the aforementioned cases is therefore a connection process that takes place at relatively high temperatures. The connecting process may be carried out in furnaces suitable therefor or, for example, in the case of brazing processes, in a capsule under vacuum; in case of an NiTi alloy as material for the cooling insert 2, the brazing temperature can be estimated with a maximum of about 1350° C. i.e., with a memory material consisting of Ni and Ti at a ratio of one-half to one-half by weight, the expansion, respectively, circumferential increase of the insert 2 can be estimated with about 6 to 7% when exceeding the threshold temperature; it follows therefrom, on the other, that the cooling insert 2 can be conveniently inserted into the corresponding blade inner geometry with the manufacture of the blade with sufficiently small dimensions before, for example, the high temperature brazing process is started.

According to FIG. 2, the insert 2 is brazed together with the blade profile hollow body 1 along the places L, i.e., more accurately at, respectively, in the corresponding upper aperture of the cover plate 5 at the head side, that is, the brazing takes place in the head-side component end area, but it could also be undertaken in the base-side end area and/or in the top-side end area.

As shown in FIGS. 1 to 3, or as similarly constructed, the non-detachable metallurgical fixed connection should be arranged radially outside of the blade geometry circumcirculated directly by the hot gas in order not to impair, for example, a brazed connection as regards its strength; this offers the further advantage that notwithstanding an abutment of the insert 2 on the corresponding ends of the knubs 3 and 4 which is free of play, differences in expansion which, inter alia, are thermally conditioned, can be compensated.

In the embodiment according to FIGS. 1 to 3, the cooling insert 2 may be acted upon selectively from the upper or lower side by means of cooling air taken off from the propulsion unit compressor; the cooling air thereby reaches at first the interior or pressure space 7 of the insert 2. From there, the cooling air can be fed by means of openings contained in the insert 2 in the direction toward the nose edge area (arrows F) as well as laterally locally directed to the channel sections 8 and 9 formed between the knubs 3 and 4 (arrows G, H). After flowing through the channel sections 8 and 9, the cooling air reaches a downstream blade hollow space 10, from which the cooling air is fed to the hot gas stream, according to the arrow direction K, by way of discharge bores 11 which are arranged on the blade rear edge and on the blade pressure side.

FIGS. 4 and 5 illustrate modifications of the turbine guide blades in which the respective cooling insert 2 is equipped with an enlargement, in this case, for example, with an enlargement 12 at the top side constructed as structural component end abutment. The insert 2 can be metallurgically fixedly connected, for example, by brazing along the places L' (FIG. 4) or L" (FIG. 5) with the blade profile hollow body 1, respectively, with the cover plate configuration 5 thereof, in this case, for example, with the outer cover plate configuration 5 thereof.

FIG. 5 further differs from FIG. 4 in that the enlargement 12 is seated in a coordinated recess 13 assisting the local positioning of the insert 2, which is formed in its turn in the upper cover plate 5.

In contrast to FIGS. 1 to 3, the corresponding material projections 14 of the blade hollow body 1 which in that case are web-like, form in FIGS. 4 and 5 individual cooling channels 15 which extend in the blade profile direction in the sense of the profile cross section according to FIG. 1.

Differing from FIGS. 1 to 3 as well as FIGS. 4 and 5, in FIG. 6 the cooling insert 2' forms itself by means of suitable undulated profiles 16, cooling channels 17 in the sense of those (15) according to FIGS. 4 and 5. However, within the scope of these profilings 16 according to FIG. 6, cooling channel sections could be obtained also without any problem as can be seen from FIGS. 1 and 2. FIG. 6 further differs from FIG. 5 in that the respective enlargement 12' of the insert 2' which is constructed as end abutment, forms at the same time a local cover plate of the insert 2' as well as of the cooling channel system.

In FIGS. 4 to 6 the enlargements 12 and 12' could also be integral wall components of the inserts 2 and 2'.

FIG. 7 illustrates a possible application for the present invention in which the blade hollow profile body 17 includes two spatially separated cooling inserts 18 and 19 made of a memory material. The cooling inserts 18 and 19 also abut in this embodiment without play at the projecting knubs 20, as a consequence of previously exceeding the temperature threshold values which occur in the metallurgical connecting process; the knubs 20, in their turn, provide the blade interior geometry matched to the inserts 18 and 19.

FIG. 7 further illustrates an application in combination with a convection cooling (arrow L), with a nose edge impact cooling (arrow M) and with a film cooling (arrow N) along pressure-, respectively, suction-side blade surfaces.

The inserts 18 and 19 thereby form, for example, on the side of the blade base, pressure spaces 21 and 22 acted upon with cooling air. Initially, the impact cooling (arrow M) is realized by means of bores in the insert 18 on the side of the nose edge, whereupon—under blade wall convection cooling (arrow L)—the cooling air flows off by way of channels contained in the blade jacket, according to arrow directions N, tangentially along the blade pressure-, respectively, suction-side blade walls into the hot gas stream. The cooling air flows from the pressure space 22 of the insert 19 by way of locally correspondingly positioned bores into the intermediate spaces—between insert 19 and blade jacket—(arrow L), from there the cooling air reaches by way of bores (arrow sequence O) a separate hollow space 23 at the blade rear edge side, from the latter the cooling air then flows into the hot gas stream by way of bores (P) which discharge tangentially along the blade discharge edge.

According to the present invention, the respective memory material—in addition to the NiTi alloy already mentioned in connection with FIGS. 1 to 3—may also be, inter alia, a copper-zinc-aluminum (Cu Zn Al) alloy or a copper-aluminum-nickel (Cn Al Ni) alloy.

The application of the present invention of course is not limited to turbine blades; all hollow component configurations exposed in the machine or apparatus design to comparable or similar criteria, which require a comparatively thin-walled sheet metal insert, can be shaped, respectively, constructed in the manner according to the present invention.

The present invention can also be practiced advantageously if in lieu of the insert, respectively, cooling insert type of construction which is closed in itself and which can be seen from the aforementioned examples, a sheet metal insert type of construction separated locally at a place is provided which is in harmony with the advantageous criteria of the "memory effect". For that purpose—depending on local conditions of installation—the expansion effect which accompanies when exceeding a temperature threshold, may be combined with a shape change effect in the sense of an insert-unfolding in order to assure the "flush" play-free abutment and support of the insert, respectively, cooling insert (turbine blade) at the respective hollow component (respectively blade-) inner geometry. This can be seen from FIG. 8 in which the insert 18', initially inserted with relatively large clearance into the corresponding blade recess (dash contour), unfolds after exceeding the threshold temperature without play against the blade inner contour constructed of knubs 20'. An insert locking also takes place thereby in that the respective free ends of the insert 18' engage in corner spaces 30 which are formed between blade wall webs 31 radially stacked one above the other and knub ends adjoining the same.

In the embodiment according to FIG. 9, the insert 2" may be connected locally fixedly with the blade hollow profile body 1 in the sense of the aforementioned "two-way memory effect"; that is, in the course of the illustrated unfolding (arrows F), respectively, bending of the initially straight ends 32 protruding radially out of the blade body 1 against the corresponding surfaces of the outer cover band segment 5, a high temperature shape (c) of the insert is represented. This high temperature shape c also changes only insignificantly when cooling off (shape d, cooled off) so that no danger of detachment of the cooling insert 2" exists. In the mentioned high temperature shape c, the ends 32 of the cooling insert 2" therefore form an enlargement in the sense of numeral 12 (FIG. 4). The insert fastening according to FIG. 9 requires therefore in principle no metallurgical connecting process, for example, by brazing or welding, but a suitable temperature admission process for the "shape-memory-effect" which is integrated into the manufacture.

A cooling insert fastening according to FIG. 9, however, can be readily combined also within the scope of the present invention with a metallurgical connecting process (see brazing places L', L"—FIGS. 4 and 5) in which process at the same time the necessary changeover temperature, respectively, temperature threshold exceedings for the "memory effect" can be provided.

While we have show and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A metallic hollow turbine blade whose inner geometry is matched to at least one completely pre-profiled metallic cooling insert means supported thereon, the cooling insert means being secured at the hollow structural turbine blade under predetermined heat influence, and wherein said insert means is made of a memory material that abuts substantially free of play at the inner geometry after exceeding a predetermined temperature threshold value.

2. A metallic hollow structural turbine blade with cooling insert means according to claim 1, wherein the cooling insert means and blade are mutually supported substantially without play by web-like or knub-like protruding material projections forming a suitable blade cooling geometry.

3. A hollow structural turbine blade with cooling insert means according to claim 2, wherein the material projections are on the side of the blade.

4. A hollow body structural turbine blade with cooling insert means according to claim 2, wherein the material projections are on the side of the cooling insert means.

5. A hollow structural turbine blade with cooling insert means according to claim 1, wherein the metallurgical fixed connection is provided radially outwardly of the blade geometry circumcirculated directly by hot gases.

6. A hollow structural turbine blade with cooling insert means according to claim 5, wherein the connection takes place at cover band segment plates of the turbine blade.

7. A hollow structural turbine blade with cooling insert means according to claim 6, wherein the cover band segment plates are at the top side.

8. A hollow structural turbine blade with cooling insert means according to claim 6, wherein the cover band segment plates are at the base side.

9. A hollow structural turbine blade with cooling insert means according to claim 5, wherein the metallurgical fixed connection takes place by brazing or welding.

10. A hollow structural turbine blade with cooling insert means according to claim 1, wherein an NiTi or CuZnAl or a CuAlNi alloy is provided as memory material.

11. A hollow structural turbine blade with cooling insert means according to claim 10, wherein the memory material consists of about 50% of nickel and about 50% of titanium by weight.

12. A metallic hollow structural part whose inner geometry is matched to at least one completely pre-profiled metallic insert means supported thereon, the insert means being secured at the hollow structural part under predetermined heat influence; wherein said insert means is made of a memory material that abuts substantially free of play at the inner geometry after exceeding a predetermined temperature threshold value; and wherein a mutual metallurgical fixed connection takes place at least within an end area of the structural part.

13. A metallic hollow structural part whose inner geometry is matched to at least one completely pre-profiled metallic insert means supported thereon, the insert means being secured at the hollow structural part under predetermined heat influence; wherein said insert means is made of a memory material that abuts substantially free of play at the inner geometry after exceeding a predetermined temperature threshold value; wherein the insert means includes enlargement means at least at one of base and top side thereof and constructed as end abutment at the structural part; and wherein the insert means being fixedly connected with the structural part by the enlargement means.

14. A metallic hollow structural part according to claim 13, wherein the hollow structural part includes a recess matched to the enlargement means.

15. A hollow structural part according to claim 13, wherein the structural part is a blade and the insert means is a cooling insert, and wherein the enlargement means is produced by an unfolding caused by the shape change of the cooling insert.

16. A metallic hollow structural part whose inner geometry is matched to at least one completely pre-profiled metallic insert means supported thereon, the insert means being secured at the hollow structural part under predetermined heat influence; wherein said insert means is made of a memory material that abuts substantially free of play at the inner geometry after exceeding a predetermined temperature threshold value; and wherein the insert means is constructed and arranged as a fully closed insert means or separated at least partially in the direction of the structure part's height in such a manner that when exceeding a predetermined temperature threshold value, it is subjected at least partially to an unfolding shape change.

17. A hollow structural part according to claim 16, wherein the insert means is a cooling insert and said hollow standard part is a turbine blade.

18. A hollow structural part according to claim 16, wherein the insert means is locally fixedly connected with the hollow structural part in the course of an unfolding caused by shape change.

19. A hollow structural part according to claim 18, wherein the insert means is a cooling insert and the hollow structural part is a blade hollow profile body.

* * * * *